US012260820B2

(12) United States Patent
Son et al.

(10) Patent No.: US 12,260,820 B2
(45) Date of Patent: Mar. 25, 2025

(54) PIXEL CIRCUIT AND DISPLAY DEVICE INCLUDING THE SAME

(71) Applicant: LG DISPLAY CO., LTD., Seoul (KR)

(72) Inventors: Ki Min Son, Paju-si (KR); Chang Hee Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 18/369,257

(22) Filed: Sep. 18, 2023

(65) Prior Publication Data

US 2024/0013720 A1 Jan. 11, 2024

Related U.S. Application Data

(62) Division of application No. 17/852,906, filed on Jun. 29, 2022, now Pat. No. 11,798,476.

(30) Foreign Application Priority Data

Jul. 8, 2021 (KR) ........................ 10-2021-0089997
Nov. 29, 2021 (KR) ........................ 10-2021-0166801

(51) Int. Cl.
*G09G 3/3233* (2016.01)
*G09G 3/3266* (2016.01)
*G09G 3/3283* (2016.01)

(52) U.S. Cl.
CPC ......... *G09G 3/3233* (2013.01); *G09G 3/3266* (2013.01); *G09G 3/3283* (2013.01);
(Continued)

(58) Field of Classification Search
CPC .. G09G 3/3233; G09G 3/3266; G09G 3/3283; G09G 2300/0426;
(Continued)

(56) References Cited

U.S. PATENT DOCUMENTS

2015/0171156 A1* 6/2015 Miyake ............... H01L 29/7869 257/43
2015/0187276 A1* 7/2015 Shim .................... G09G 3/3291 345/77

(Continued)

FOREIGN PATENT DOCUMENTS

CN 106652910 A * 5/2017 ........... G09G 3/3233
KR 10-2014-0080729 A 7/2014

(Continued)

OTHER PUBLICATIONS

Korean Office Action dated Sep. 26, 2024 issued in Patent Application No. 10-2021-0166801 w/English Translation (9 pages).

*Primary Examiner* — Jeff Piziali
(74) *Attorney, Agent, or Firm* — Fish & Richardson P.C.

(57) ABSTRACT

A pixel circuit of a display device includes a driving element comprising a first electrode connected to a first node to which a pixel driving voltage is applied, a first gate electrode connected to a second node, a second electrode connected to a third node, and a second gate electrode connected to a fourth node, and configured to supply an electric current to a light-emitting element; a first switch element configured to be turned on according to a gate-on voltage and supply a data voltage to the second node; a first capacitor connected between the second node and the third node; a second capacitor connected between the third node and the fourth node; and a third capacitor connected between the fourth node and the first node, or between the fourth node and a power line to which the pixel driving voltage is applied.

8 Claims, 15 Drawing Sheets

(52) U.S. Cl.
CPC ............... *G09G 2300/0426* (2013.01); *G09G 2300/0819* (2013.01); *G09G 2300/0842* (2013.01); *G09G 2300/0861* (2013.01); *G09G 2310/0297* (2013.01); *G09G 2310/08* (2013.01); *G09G 2320/0233* (2013.01)

(58) Field of Classification Search
CPC ... G09G 2300/0819; G09G 2300/0842; G09G 2300/0861; G09G 2310/0297; G09G 2310/08; G09G 2320/0233
See application file for complete search history.

(56) References Cited

U.S. PATENT DOCUMENTS

| | | | | |
|---|---|---|---|---|
| 2016/0300900 | A1* | 10/2016 | Miyake | G09G 3/3233 |
| 2016/0329392 | A1* | 11/2016 | Miyake | G09G 3/3258 |
| 2018/0268757 | A1* | 9/2018 | Chen | G09G 3/3266 |
| 2019/0066587 | A1* | 2/2019 | Han | H01L 27/1218 |
| 2019/0180688 | A1* | 6/2019 | Yang | G09G 3/3233 |
| 2019/0362674 | A1* | 11/2019 | Xu | G09G 3/3241 |
| 2021/0013235 | A1* | 1/2021 | Toda | G02F 1/1368 |
| 2022/0366849 | A1* | 11/2022 | Lee | H01L 27/32 |
| 2022/0415273 | A1* | 12/2022 | Chen | G09G 3/3611 |

FOREIGN PATENT DOCUMENTS

| | | |
|---|---|---|
| KR | 10-2017-0132016 | 12/2017 |
| KR | 10-2018-0135321 | 12/2018 |
| KR | 10-2019-0067956 | 6/2019 |
| KR | 10-2020-0076995 | 6/2020 |
| KR | 10-2021-0031582 | 3/2021 |

* cited by examiner

PIXEL CIRCUIT AND DISPLAY DEVICE INCLUDING THE SAME

CROSS-REFERENCE TO RELATED APPLICATIONS

This application is a divisional of U.S. patent application Ser. No. 17/852,906, filed on Jun. 29, 2022, which claims the priorities of Korean Patent Application No. 10-2021-0089997, filed Jul. 8, 2021 and Korean Patent Application No. 10-2021-0166801, filed Nov. 29, 2021, which are hereby incorporated by reference in their entirety.

BACKGROUND

Field of the Disclosure

The present disclosure relates to a pixel circuit and a display device including the same.

Description of the Background

An electroluminescence display device may be divided into an inorganic light emitting display device and an organic light emitting display device according to the material of the emission layer. The active matrix type organic light emitting display device includes an organic light emitting diode (hereinafter, referred to as "OLED") that emits light by itself, and has the advantage of fast response speed, high light-emitting efficiency, high luminance and wide viewing angle. In the organic light emitting display device, the OLED (Organic Light Emitting Diode) is formed in each pixel. The organic light emitting display device has a fast response speed, excellent light-emitting efficiency, luminance, and viewing angle, and has also excellent contrast ratio and color reproducibility because black gray scale can be expressed as complete black.

A pixel circuit of an organic light-emitting display device includes a light-emitting element, a driving element for driving the light-emitting element, and one or more switch elements. The switch elements are turned on/off according to gate voltages to thereby connect or cut off the main nodes of the pixel circuit. The driving element and the switch elements can be implemented with transistors.

There may be differences in electrical characteristics of the driving element between pixels due to process variations caused in the manufacturing process of a display panel and element characteristic variations, and these differences may grow larger as the driving time of pixels elapses. In order to compensate for variations in electrical characteristics of the driving element between pixels, an internal compensation circuit can be embedded in the pixel circuit or a circuit can be connected to the pixel circuit. The internal compensation circuit can be embedded in the pixel circuit and sample the amount of the threshold voltage change of the driving element, thereby compensating the gate-source voltage of the driving element by the amount of the threshold voltage change. An external compensation circuit can generate a compensation value based on the result of sensing the electrical characteristics of the driving element by using the external compensation circuit connected to the pixel circuit, and can compensate for the change in the electrical characteristics of the driving element.

The image quality may deteriorate due to the limitation of the compensation capability of the internal compensation circuit. For example, if the amount of the threshold voltage change of the driving element grows larger beyond the compensation range, the threshold voltage of the driving element is not compensated, and therefore luminance variation at low grayscale can be visually recognized.

SUMMARY

Accordingly, the present disclosure is to resolve the needs and/or problems described above.

The present disclosure provides a pixel circuit capable of improving image quality by overcoming the compensation limit in pixels including an internal compensation circuit, and a display device including the same.

The drawbacks which this disclosure addresses are not limited to the aforementioned ones, but other drawbacks which can be solved by this disclosure will become apparent to those skilled in the art from the description below.

A pixel circuit in accordance with one aspect of the present disclosure comprises a driving element comprising a first electrode connected to a first node to which a pixel driving voltage is applied, a first gate electrode connected to a second node, a second electrode connected to a third node, and a second gate electrode connected to a fourth node, and configured to supply an electric current to a light-emitting element; a first switch element configured to be turned on according to a gate-on voltage and supply a data voltage to the second node; a first capacitor connected between the second node and the third node; a second capacitor connected between the third node and the fourth node; and a third capacitor connected between the fourth node and the first node, or between the fourth node and a power line to which the pixel driving voltage is applied.

A display device of the present disclosure includes the pixel circuit.

The present disclosure can improve the S-factor of the driving element by applying a back-bias voltage to the driving element and adjusting the capacitance ratio of the capacitors.

The present disclosure can improve the S-factor and thus overcome the limitation of the internal compensation circuit, thereby improving the image quality.

Effects of this disclosure are not limited to the effects mentioned above, and other effects not mentioned above will be clearly appreciated by those skilled in the art from the appended claims.

BRIEF DESCRIPTION OF THE DRAWINGS

The above and other features and advantages of the present disclosure will become more apparent to those of ordinary skill in the art by describing exemplary aspects thereof in detail with reference to the attached drawings, in which.

DETAILED DESCRIPTION

Figure 1:
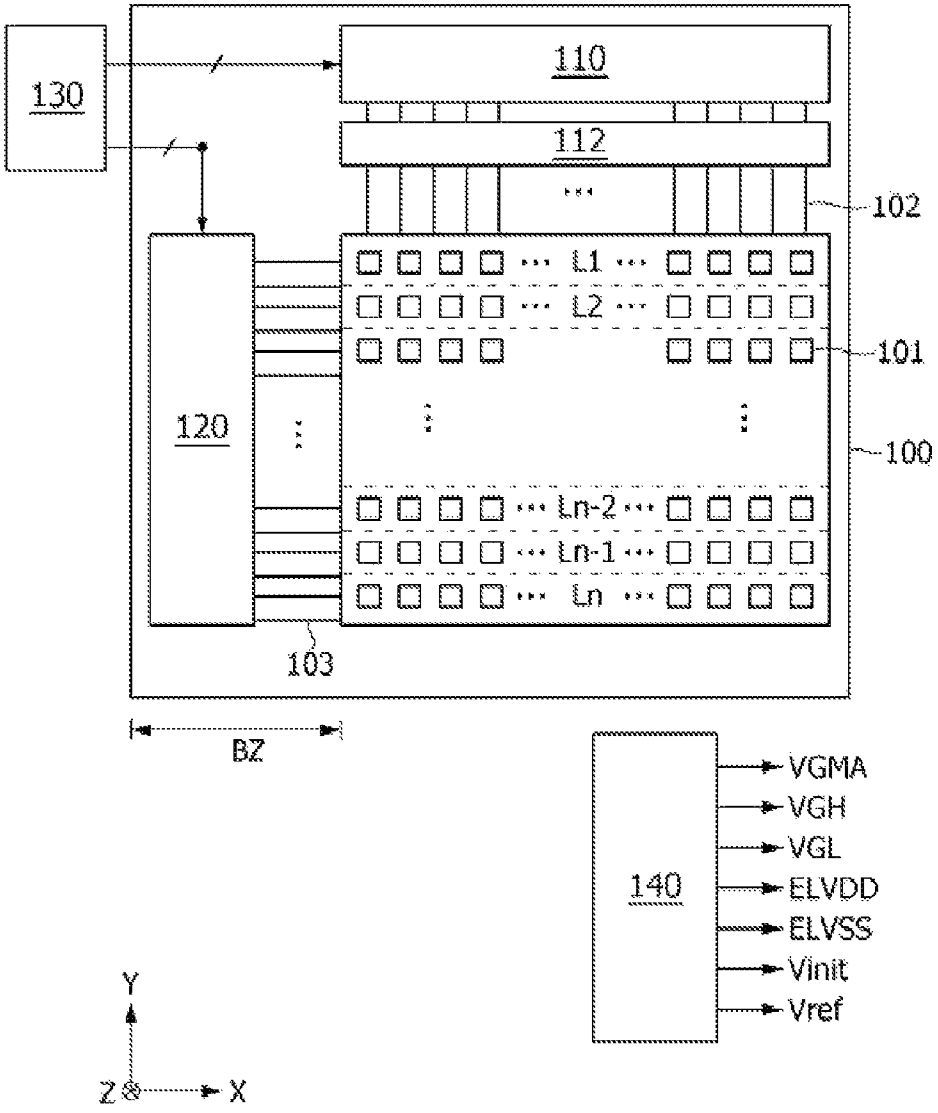
FIG. 1 is a block diagram showing a display device in accordance with one aspect of the present disclosure.

The advantages and features of the present disclosure and methods for accomplishing the same will be more clearly understood from aspects described below with reference to the accompanying drawings. However, the present disclosure is not limited to the following aspects but may be implemented in various different forms. Rather, the present aspects will make the disclosure of the present disclosure complete and allow those skilled in the art to completely comprehend the scope of the present disclosure. The present disclosure is only defined within the scope of the accompanying claims.

The shapes, sizes, ratios, angles, numbers, and the like illustrated in the accompanying drawings for describing the aspects of the present disclosure are merely examples, and the present disclosure is not limited thereto. Like reference numerals generally denote like elements throughout the present specification. Further, in describing the present disclosure, detailed descriptions of known related technologies may be omitted to avoid unnecessarily obscuring the subject matter of the present disclosure.

The terms such as "comprising," "including," "having," and "consist of" used herein are generally intended to allow other components to be added unless the terms are used with the term "only." Any references to singular may include plural unless expressly stated otherwise.

Components are interpreted to include an ordinary error range even if not expressly stated.

When the position relation between two components is described using the terms such as "on," "above," "below," and "next," one or more components may be positioned between the two components unless the terms are used with the term "immediately" or "directly."

The terms "first," "second," and the like may be used to distinguish components from each other, but the functions or structures of the components are not limited by ordinal numbers or component names in front of the components.

The following aspects can be partially or entirely bonded to or combined with each other and can be linked and operated in technically various ways. The aspects can be carried out independently of or in association with each other.

Each of the pixels may include a plurality of sub-pixels having different colors to in order to reproduce the color of the image on a screen of the display panel. Each of the sub-pixels includes a transistor used as a switch element or a driving element. Such a transistor may be implemented as a TFT (Thin Film Transistor).

A driving circuit of the display device writes a pixel data of an input image to pixels on the display panel. To this end, the driving circuit of the display device may include a data driving circuit configured to supply data signal to the data lines, a gate driving circuit configured to supply a gate signal to the gate lines, and the like.

In a display device of the present disclosure, the pixel circuit and the gate driving circuit may include a plurality of transistors. Transistors may be implemented as oxide thin film transistors (oxide TFTs) including an oxide semiconductor, low temperature polysilicon (LTPS) TFTs including low temperature polysilicon, or the like. In aspects, descriptions will be given based on an example in which the transistors of the pixel circuit and the gate driving circuit are implemented as the n-channel oxide TFTs, but the present disclosure is not limited thereto.

Generally, a transistor is a three-electrode element including a gate, a source, and a drain. The source is an electrode that supplies carriers to the transistor. In the transistor, carriers start to flow from the source. The drain is an electrode through which carriers exit from the transistor. In a transistor, carriers flow from a source to a drain. In the case of an n-channel transistor, since carriers are electrons, a source voltage is a voltage lower than a drain voltage such that electrons may flow from a source to a drain. The n-channel transistor has a direction of a current flowing from the drain to the source. In the case of a p-channel transistor, since carriers are holes, a source voltage is higher than a drain voltage such that holes may flow from a source to a drain. In the p-channel transistor, since holes flow from the source to the drain, a current flows from the source to the drain. It should be noted that a source and a drain of a transistor are not fixed. For example, a source and a drain may be changed according to an applied voltage. Therefore, the disclosure is not limited due to a source and a drain of a transistor. In the following description, a source and a drain of a transistor will be referred to as a first electrode and a second electrode.

A gate signal swings between a gate-on voltage and a gate-off voltage. The gate-on voltage is set to a voltage higher than a threshold voltage of a transistor, and the gate-off voltage is set to a voltage lower than the threshold voltage of the transistor.

The transistor is turned on in response to the gate-on voltage and is turned off in response to the gate-off voltage. In the case of an n-channel transistor, a gate-on voltage may be a gate high voltage VGH and VEH, and a gate-off voltage may be a gate low voltage VGL and VEL.

Hereinafter, various aspects of this disclosure will be described with reference to the accompanying drawings. In the following aspects, the display device will be described mainly with respect to the organic light emitting display device, but this disclosure is not limited thereto. Also, the scope of this disclosure is not intended to be limited by the names of components or signals in the following aspects and claims.

Figure 2:
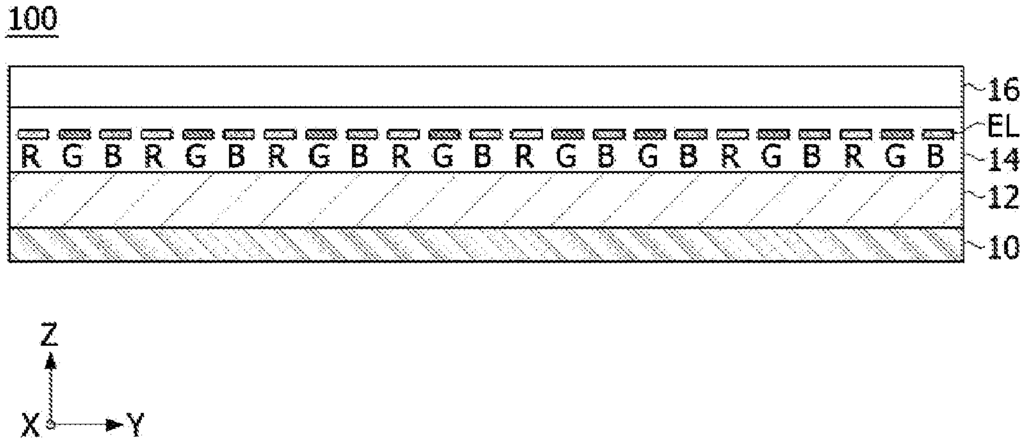
FIG. 2 is a cross-sectional view showing a cross-sectional structure of the display panel shown in FIG. 1.

Referring to FIGS. 1 and 2, a display device according to an aspect of this disclosure includes a display panel 100, a display panel driver for writing pixel data to pixels of the display panel 100, and a power supply 140 for generating power required to drive the pixels and the display panel driver.

The display panel 100 may be a panel having a rectangular structure with a length in the X-axis direction, a width in the Y-axis direction, and a thickness in the Z-axis direction. The display panel 100 includes a pixel array that displays an input image on a screen. The pixel array includes a plurality of data lines 102, a plurality of gate lines 103 crossing the data lines 102, and pixels arranged in a matrix form. The display panel 100 may further include power lines commonly connected to the pixels. The power lines supply a constant voltage required for driving the pixels 101 to the pixels 101. For example, the display panel 100 may include a VDD line to which a pixel driving voltage ELVDD is applied, and a VSS line to which a low-potential power supply voltage ELVSS is applied. In addition, the power lines may further include a REF line to which the reference voltage Vref is applied, and an INIT line to which the initialization voltage Vinit is applied.

As shown in FIG. 2, the cross-sectional structure of the display panel 100 may include a circuit layer 12 stacked on a substrate 10, a light emitting element layer 14, and an encapsulation layer 16.

The circuit layer 12 may include a TFT array including a pixel circuit connected to wires such as a data line, a gate line, a power line, and the like, a de-multiplexer array 112, a gate driver 120 and the like. The wire and circuit elements of the circuit layer 12 may include a plurality of insulating layers, two or more metal layers separated with the insulating layer therebetween, and an active layer including a semiconductor material. All transistors formed in the circuit layer 12 may be implemented as an n-channel oxide TFT.

The light emitting element layer 14 may include a light emitting element EL driven by the pixel circuit. The light emitting element EL may include a red (R) light emitting element, a green (G) light emitting element, and a blue (B) light emitting element. In another aspect, the light emitting element layer 14 may include a white light emitting element and a color filter. The light emitting elements EL of the light emitting element layer 14 may be covered by multiple protective layers in which an organic layer and an inorganic layer are stacked.

The encapsulation layer 16 covers the light emitting element layer 14 to seal the circuit layer 12 and the light emitting element layer 14. The encapsulation layer 16 may also have a multi-insulating film structure in which an organic film and an inorganic film are alternately stacked. The inorganic film blocks permeation of moisture and oxygen. The organic film planarizes the surface of the inorganic film. When the organic layer and the inorganic layer are stacked in multiple layers, the movement path of moisture or oxygen becomes longer than that of a single layer, so that penetration of moisture and oxygen affecting the light emitting element layer 14 can be effectively blocked.

A touch sensor layer omitted from the drawing may be formed on the encapsulation layer 16, and a polarizer or a color filter layer may be disposed thereon. The touch sensor layer may include capacitive touch sensors that sense a touch input based on a change in capacitances before and after the touch input. The touch sensor layer may include insulating layers and metal wire patterns forming the capacitance of the touch sensors. The insulating layers may insulate the crossing portions of the metal wire patterns, and may planarize the surface of the touch sensor layer. The polarizer may improve visibility and contrast ratio by converting the polarization of external light reflected by the metal of the touch sensor layer and the circuit layer. The polarizer may be implemented as a polarizer or a circular polarizer to which a linear polarizer and a phase retardation film are bonded. A cover glass may be adhered to the polarizer. The color filter layer may include red, green, and blue color filters. The color filter layer may further include a black matrix pattern. The color filter layer absorbs a portion of the wavelength of light reflected from the circuit layer and the touch sensor layer, so that it can replace the polarizer and increase the color purity of the image reproduced in the pixel array.

The pixel array includes a plurality of pixel lines L1 to Ln. Each of the pixel lines L1 to Ln includes one line of pixels arranged along the line direction (X-axis direction) in the pixel array of the display panel 100. The pixels arranged in one pixel line share gate lines 103. Sub-pixels arranged in the column direction Y along the data line direction share the same data line 102. One horizontal period is a time obtained by dividing one frame period by the total number of pixel lines L1 to Ln.

The display panel 100 may be implemented as a non-transmissive display panel or a transmissive display panel. The transmissive display panel may be applied to a transparent display device in which an image is displayed on a screen and an actual background is visible. The display panel 100 may be manufactured as a flexible display panel.

Each of the pixels 101 may be divided into a red sub-pixel, a green sub-pixel, and a blue sub-pixel to implement color. Each of the pixels may further include a white sub-pixel. Each of the sub-pixels includes a pixel circuit. Hereinafter, a pixel may be interpreted as having the same meaning as a sub-pixel. Each of the pixel circuits is connected to a data line, gate lines, and power lines.

The pixels may be arranged as real color pixels and pentile pixels. The pentile pixel may implement a higher resolution than a real color pixel by driving two sub-pixels having different colors as one pixel 101 using a preset pixel rendering algorithm. The pixel rendering algorithm may compensate for insufficient color representation in each pixel with the color of light emitted from an adjacent pixel.

The power supply 140 generates a direct current (DC) voltage (or a constant voltage) required for driving the pixel array of the display panel 100 and the display panel driver by using a DC-DC converter. The DC-DC converter may include a charge pump, a regulator, a buck converter, a boost converter, and the like. The power supply 140 may generate DC voltage (or constant voltage) such as the gamma reference voltage VGMA, gate-on voltage VGH, gate-off voltage VGL, pixel driving voltage ELVDD, low-potential power supply voltage ELVSS, initialization voltage Vinit, reference voltage Vref, or the like by adjusting the level of the DC input voltage applied from the host system (not shown). The gamma reference voltage VGMA is supplied to the data driver 110. The gate-on voltage VGH and the gate-off voltage VGL are supplied to the gate driver 120. The constant voltage such as pixel driving voltage ELVDD, low-potential power supply voltage ELVSS, initialization voltage Vinit, reference voltage Vref, or the like is supplied to the pixels 101 through power lines commonly connected to the pixels 101. The constant voltages applied to the pixel circuit may have different voltage levels.

The display panel driver writes the pixel data of the input image to the pixels of the display panel 100 under the control of the timing controller 130.

The display panel driver includes the data driver 110 and the gate driver 120. The display panel driver may further include a de-multiplexer array 112 disposed between the data driver 110 and the data lines 102.

The de-multiplexer array 112 sequentially supplies the data voltages outputted from the channels of the data driver 110 to the data lines 102 using a plurality of de-multiplexers (DEMUX). The de-multiplexer may include a multiple of switch elements disposed on the display panel 100. When the de-multiplexer is disposed between the output terminals of the data driver 110 and the data lines 102, the number of channels of the data driver 110 may be reduced. The de-multiplexer array 112 may be omitted.

The display panel driver may further include a touch sensor driver for driving the touch sensors. The touch sensor driver is omitted from FIG. 1. The data driver 110 and the touch sensor driver may be integrated into a single drive integrated circuit (IC). In a mobile device or a wearable device, the timing controller 130, the power supply 140, the data driver 110, and the like may be integrated into one drive IC.

The display panel driver may operate in a low speed driving mode under the control of the timing controller 130. The low speed driving mode may be set to reduce power consumption of the display device when the input image does not change by a preset number of frames by analyzing the input image. In the low speed driving mode, the power consumption of the display panel driver and the display panel 100 may be reduced by lowering a refresh rate of pixels when a still image is inputted for a predetermined time or longer. The low speed driving mode is not limited to when a still image is inputted. For example, when the display device operates in the standby mode or when a user command or an input image is not inputted to the display panel driving circuit for a predetermined time or longer, the display panel driving circuit may operate in the low speed driving mode.

The data driver 110 receives pixel data of an input image received as a digital signal from the timing controller 130, and outputs a data voltage. The data driver 110 generates a data voltage Vdata by converting pixel data of an input image into a gamma compensation voltage every frame period using a digital to analog converter (DAC). The gamma reference voltage VGMA is divided into a gamma compensation voltage for each gray scale through a voltage divider circuit. The gamma compensation voltage for each gray level is provided to the DAC of the data driver 110. The data voltage Vdata is outputted from each of the channels of the data driver 110 through an output buffer.

The gate driver 120 may be implemented as a gate in panel (GIP) circuit formed in the circuit layer 12 on the display panel 100 together with the TFT array and wires of the pixel array. The gate driver 120 may be disposed on a bezel BZ, which is non-display region of the display panel 100, or may be distributedly disposed in a pixel array in which an input image is reproduced. The gate driver 120 sequentially outputs the gate signal to the gate lines 103 under the control of the timing controller 130. The gate driver 120 may sequentially supply the gate signals to the gate lines 103 while shifting the gate signals using a shift register. The gate signal may include various gate pulses such as a scan pulse, a sensing pulse, an initialization pulse, a light emitting control pulse (hereinafter, referred to as an "EM pulse") and the like.

The timing controller 130 receives digital video data DATA of an input image from the host system, and a timing signal synchronized with the digital video data DATA. The timing signal may include a vertical synchronization signal Vsync, a horizontal synchronization signal Hsync, a clock CLK, a data enable signal DE, and the like. Since the vertical period and the horizontal period can be known by means of counting the data enable signal DE, the vertical synchronization signal Vsync and the horizontal synchronization signal Hsync may be omitted. The data enable signal DE has a period of one horizontal period (1H).

The host system may be any one of a TV (Television) system, a tablet computer, a notebook computer, a navigation system, a personal computer (PC), a home theater system, a mobile device, a wearable device, and a vehicle system. The host system may scale the image signal from the video source to fit the resolution of the display panel 100, and may transmit it to the timing controller 130 together with the timing signal.

The timing controller 130 may multiply the input frame frequency by i (i is a natural number) in the normal driving mode, so that it can control the operation timing of the display panel driver at a frame frequency of the input frame frequency×i Hz. The input frame frequency is 60 Hz in the NTSC (National Television Standards Committee) scheme, while it is 50 Hz in the PAL (Phase-Alternating Line) scheme.

The timing controller 130 lowers a frame frequency (or data refresh rate) at which pixel data is written to pixels in the low speed driving mode compared to the normal driving mode. For example, in the normal driving mode, a frame frequency at which pixel data is written to pixels may occur at a frequency of 60 Hz or higher, for example, at the frame frequency of any one of 60 Hz, 120 Hz, and 144 Hz, and the frame frequency in the low speed driving mode may occur at a lower frequency than that of the normal driving mode. For example, the timing controller 130 may lower the driving frequency of the display panel driver by lowering the frame frequency to a frequency between 1 Hz and 30 Hz in order to lower the refresh rate of pixels in the low speed driving mode.

The timing controller 130 generates a data timing control signal for controlling the operation timing of the data driver 110, a control signal for controlling the operation timing of the de-multiplexer array 112, and a gate timing control signal for controlling the operation timing of the gate driver 120, based on the timing signals Vsync, Hsync, DE received from the host system. The timing controller 130 controls the operation timing of the display panel driver to synchronize the data driver 110, the de-multiplexer array 112, the touch sensor driver, and the gate driver 120.

The gate timing control signal generated from the timing controller 130 may be inputted to the shift register of the gate driver 120 through a level shifter (not shown). The level shifter may receive the gate timing control signal, generate a start pulse and a shift clock, and provide them to the shift register.

Figure 3:
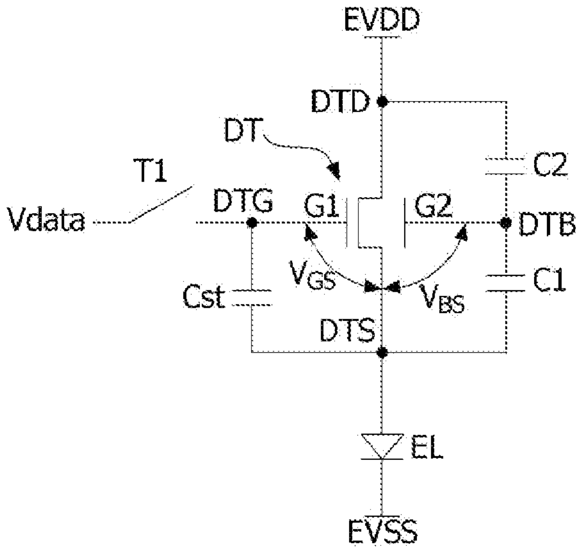
FIG. 3 is a circuit diagram showing a pixel circuit in accordance with one aspect of the present disclosure.

FIG. 3 is a circuit diagram showing a pixel circuit in accordance with one aspect of the present disclosure.

Referring to FIG. 3, the pixel circuit includes a light-emitting element EL, a driving element DT for driving the light-emitting element EL, a first switch element T1, and first to third capacitors Cst, C1, and C2. The driving element DT and the switch element T1 may be implemented with n-channel oxide TFTs.

The light-emitting element EL may be implemented with an OLED. The OLED includes an organic compound layer formed between the anode electrode and the cathode electrode. The organic compound layer may include, but is not limited to, a hole injection layer HIL, a hole transport layer HTL, an emission layer EML, an electron transport layer ETL, and an electron injection layer EIL. When a voltage is applied to the anode and cathode electrodes of the OLED, the holes that have passed through the hole transport layer HTL and the electrons that have passed through the electron transport layer ETL are moved to the emission layer EML, and excitons are formed. At this time, visible light is emitted from the emission layer EML. The anode electrode of the light-emitting element EL is connected to a third node DTS. A low-potential power supply voltage EVSS is applied to the cathode electrode of the light-emitting element EL. The OLED used as the light-emitting element EL may be of a tandem structure in which a plurality of light-emitting layers are stacked. An OLED of the tandem structure can improve the luminance and lifespan of pixels.

The driving element DT may be implemented with a double gate structure including a first gate electrode G1 and a second gate electrode G2. The driving element DT includes a first electrode connected to a first node DTD, a first gate electrode G1 connected to a second node DTG, a second electrode connected to the third node DTS, and a second gate electrode connected to a fourth node DTB. A pixel driving voltage EVDD is applied to the first node DTD connected to the first electrode of the driving element DT. The first electrode may be a drain electrode, and the second electrode may be a source electrode. The second gate electrode G2 may be interpreted as a body electrode or a bottom gate electrode. The first gate electrode G1 and the second gate electrode G2 may overlap each other, with a semiconductor layer interposed therebetween.

In the driving element DT, a back-bias voltage $V_{BS}$ between the second gate electrode G2 and the second electrode can shift the threshold voltage Vth of the driving element DT to a desired voltage.

The first switch element T1 is turned on in response to a gate-on voltage VGH and thereby applies the data voltage Vdata of pixel data to the second node DTG connected to the first gate electrode G1 of the driving element DT. The first switch element T1 is turned off in response to a gate-off voltage VGL.

The first capacitor Cst is connected between the second node DTG and the third node DTS and stores the gate-source voltage $V_{GS}$ of the driving element DT.

The second capacitor C1 is connected between the third node DTS and the fourth node DTB. The back-bias voltage $V_{BS}$ of the driving element DT is charged in the second capacitor C1. The back-bias voltage $V_{BS}$ is a voltage applied between the third node DTS and the fourth node DTB. The voltage at the fourth node DTB is determined according to the voltage of the third node DTS*the capacitor transfer rate. The voltage at the third node DTS changes according to the data voltage Vdata applied to the second node DTG. Therefore, a threshold voltage shift (Vth shift) of the driving element DT occurs for each grayscale of the pixel data, and the S-factor (Subthreshold Slope factor) of the driving element can be improved.

The third capacitor C2 is connected between the first node DTD and the fourth node DTB. The voltage at the fourth node DTB may be changed by the capacitor transfer rate C1/(C1+C2) determined according to the capacitances of the second and third capacitors C1 and C2.

The voltage at the third node DTS changes according to the current (or luminance) flowing through the light-emitting element EL. The voltage loss of the back-bias voltage $V_{BS}$ of the driving element DT is determined according to the capacitor transfer rate. The back-bias voltage $V_{BS}$ is defined as $V_{BS}$=C'(Vs)−Vs and has a negative (−) value. Here, C' is the capacitor transfer rate C1/(C1+C2), and Vs is the voltage at the third node DTS. As the amount of current flowing through the third node DTS increases, the back-bias voltage $V_{BS}$ grows larger and thus the threshold voltage shift of the driving element DT grows larger.

Figure 4:
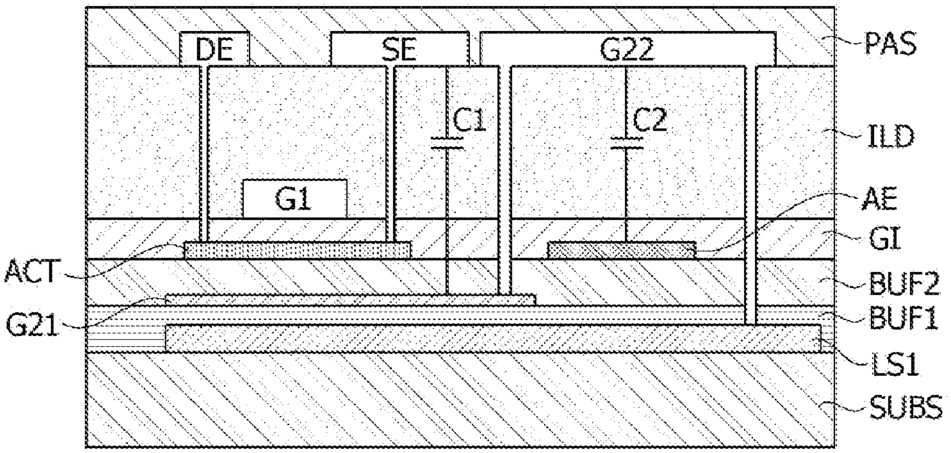
FIG. 4 is a cross-sectional view showing a cross-sectional structure of the driving element shown in FIG. 3 in a display panel.

FIG. 4 is a cross-sectional view showing a cross-sectional structure of the driving element shown in FIG. 3 in a display panel.

Referring to FIG. 4, a first metal pattern LS1 is disposed on a substrate SUBS of a display panel 100. A first insulating layer BUF is disposed on the substrate SUBS so as to cover the first metal pattern LS1.

A second metal pattern is disposed on the first insulating layer BUF. The second metal pattern includes a second gate electrode G21 of the driving element DT. A second insulating layer BUF2 is disposed on the first insulating layer BUF1 so as to cover the second metal pattern. The second metal pattern overlaps the first metal pattern LS1, with the first insulating layer BUF1 interposed therebetween.

A semiconductor layer is disposed on the second insulating layer BUF2. The semiconductor layer may be formed of an oxide semiconductor. The semiconductor layer includes an active pattern ACT forming a semiconductor channel of the driving element DT and a metallization pattern AE.

In the case of IGZO (Indium Gallium Zinc Oxide), which is an oxide semiconductor, the conduction property varies according to the oxygen content. When the oxygen content is reduced, the conductivity of the oxide semiconductor IGZO is increased, causing it to be metalized. As a method for reducing the oxygen content of the oxide semiconductor IGZO, plasma treatment may be employed. For example, if an oxide semiconductor is exposed to plasma (metallization process), the oxygen contained inside the oxide semiconductor can be removed and the resistance of the oxide semiconductor IGZO can be decreased, causing it to be metalized. Plasma treatment is a method of causing a plasma discharge in a helium (He), hydrogen (H2), or argon (Ar) gas.

The active pattern ACT of the semiconductor layer overlaps the second gate electrode G21 of the driving element, with the second insulating layer BUF2 interposed therebetween. The second gate electrode G21 may be patterned in a larger size than the active pattern ACT. The pixel driving voltage EVDD may be applied to the metallization pattern AE of the semiconductor layer.

A third insulating layer GI is disposed on the second insulating layer BUF2 so as to cover the active pattern ACT made of a semiconductor. A third metal pattern is formed on the third insulating layer GI. The third metal pattern includes a first gate electrode G1 of the driving element DT. The first gate electrode G1 overlaps the second gate electrode G21, with the active pattern ACT of the semiconductor layer interposed therebetween.

A fourth insulating layer ILD is disposed on the third insulating layer GI so as to cover the third metal pattern. A fourth metal pattern is disposed on the fourth insulating layer ILD. A fifth insulating layer PAS is disposed on the fourth insulating layer ILD so as to cover the fourth metal pattern. The fourth metal pattern includes a first electrode (or a drain electrode) DE and a second electrode (or a source electrode) SE of the driving element DT. The first and second electrodes DE and SE of the driving element DT are connected to the active pattern ACT via contact holes passing through the third and fourth insulating layers GI and ILD.

The fourth metal pattern includes a second gate electrode extension G22. The second gate electrode extension G22 is connected to the second gate electrode G21 via a contact hole passing through the second to fourth insulating layers BUF2, GI, and ILD. Further, the second gate electrode extension G22 is connected to the first metal pattern LS1 via a contact hole passing through the first to fourth insulating layers BUF1, BUF2, GI, and ILD.

The second capacitor C1 may be formed between the second electrode SE of the driving element DT connected to the third node DTS of the pixel circuit and the second gate electrode G21. The third capacitor C2 may be formed between the second gate electrode extension G22 and the metallization pattern AE. The structures of the second and third capacitors C1 and C2 are not limited to FIG. 4. The S-factor may be adjusted according to the capacitor transfer rate determined according to the capacitances of the second and third capacitors C1 and C2. The cross-sectional structure of the second and third capacitors C1 and C2 may be changed according to the set values of the capacitor transfer rate.

As shown in FIGS. 3 and 4, the second gate electrodes G21 and G22 of the driving element DT are separated from the first and second electrodes DE and SE of the driving element DT.

Figure 5:
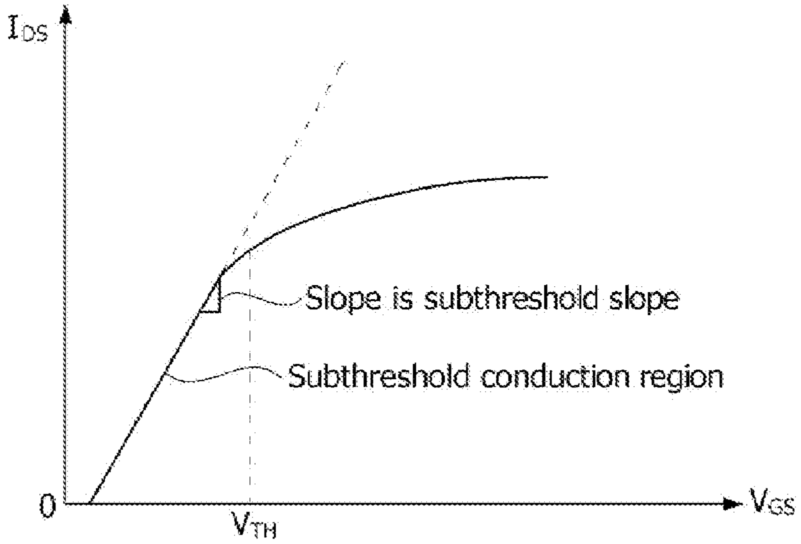
FIG. 5 is a view showing the S-factor.

FIG. 5 is a view showing the S-factor of the driving element DT. In FIG. 5, the horizontal axis represents the gate-source voltage $V_{GS}$ of the driving element DT, and the vertical axis represents the drain-source current IDS (log-scaled value) of the driving element. The S-factor is a gate voltage value for increasing the amount of drain current of the driving element DT by ten (10) times. As shown in FIG. 4, the S-factor S can be represented by the reciprocal of the slope value of the I-V conduction curve, i.e., $$S = \frac{\Delta V_{GS}}{\Delta \log(I_{DS})}[V/Dec]$$

in a subthreshold region of the driving element DT. The larger the S-factor S gets, the lower the slope of the I-V conduction curve in FIG. 5 gets.

Figure 6:
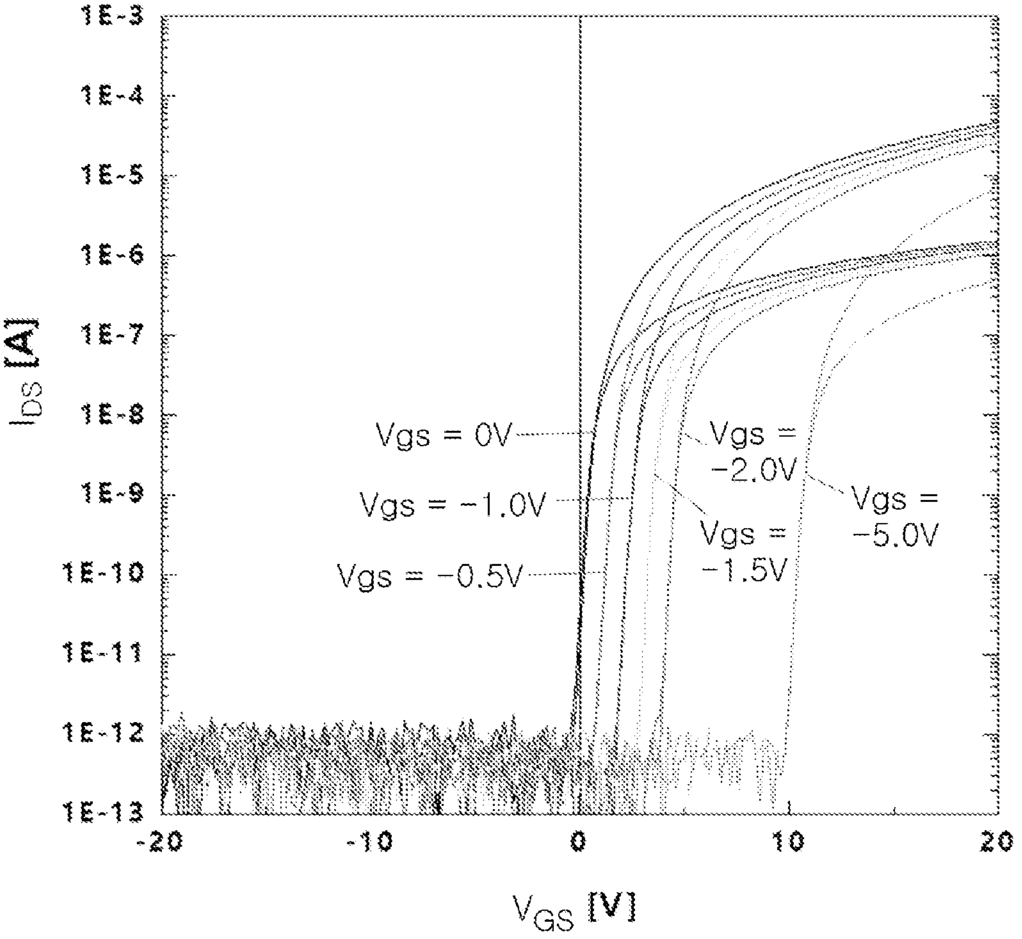
FIG. 6 shows simulation results for verifying the effect that the threshold voltage of the driving element is shifted by a back-bias voltage of the driving element.

FIG. 6 is a view showing simulation results for verifying the effect that the threshold voltage Vth of the driving element is shifted by a back-bias voltage $V_{BS}$ of the driving element DT. In FIG. 6, the horizontal axis represents the gate-source voltage $V_{GS}$ [V] of the driving element DT, and the vertical axis represents the drain-source current $I_{DS}$ [A] of the driving element DT. The back-bias voltage $V_{BS}$ can shift the threshold voltage of the driving element DT to within a sensible range. Accordingly, even if the shift of the threshold voltage of the driving element DT exceeds a sensible range, it is possible to accurately sense the threshold voltage of the driving element DT. For example, the threshold voltage of the driving element DT could not be sensed if the threshold voltage of the driving element DT is shifted to a voltage of 0V or lower, but since the threshold voltage Vth of the driving element DT can be shifted to a positive voltage greater than 0V by applying the back-bias voltage $V_{BS}$ to the driving element DT, the threshold voltage Vth of the driving element DT can be sensed. In particular, the lower the voltage Vb at the fourth node DTB applied to the second gate electrode G2 than the voltage Vs at the third node DTS, the more positively the threshold voltage Vth of the driving element DT is shifted.

Figure 7:
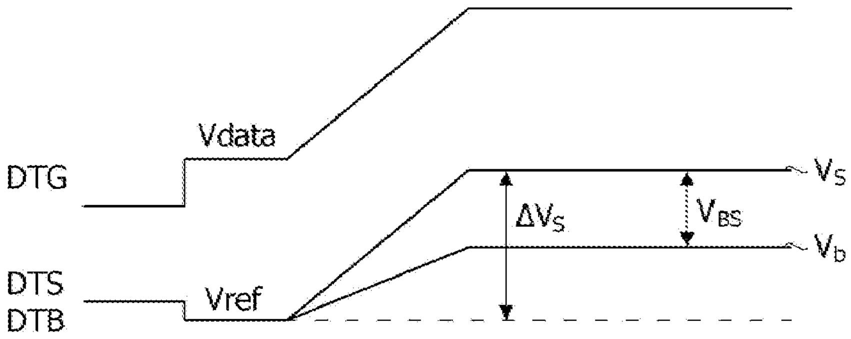
FIG. 7 is a waveform diagram showing the voltages at the main nodes of the pixel circuit shown in FIG. 3.

FIG. 7 is a waveform diagram showing the voltages at the main nodes of the pixel circuit shown in FIG. 3.

Referring to FIG. 7, the data voltage Vdata may be applied to the second node DTG of the pixel circuit and then the second node DTG may be floated. The third and fourth nodes DTS and DTB to which the reference voltage Vref is applied may then be floated. When these nodes DTG, DTS, and DTB are floated, if the voltage Vs rises due to the current flowing through the third node DTS, the voltage at the second node DTG rises and the voltage Vb at the fourth node DTB rises. At this time, a voltage loss occurs due to the capacitor transfer rate, and thus the voltage Vb at the fourth node DTB gets lower than the voltage Vs of the third node DTS. The voltage Vb of the fourth node DTB is Vb=ΔVs*{C1/C1+C2}+Vref, and the back-bias voltage $V_{BS}$ is $V_{BS}$=ΔVs*{C1/C1+C2}+Vref−Vs. Here, 'ΔVs' is the amount of voltage change at the third node DTS.

Figure 8:
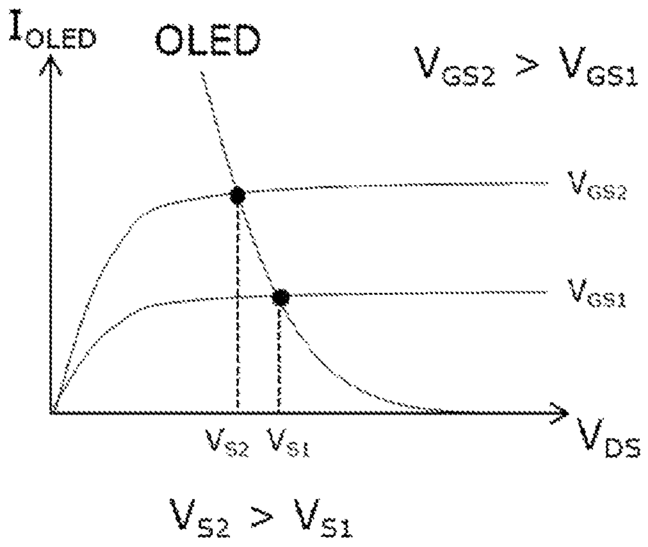
FIG. 8 is a view showing the operating characteristics of the driving element and an OLED.

FIG. 8 is a view showing the operating characteristics of the driving element and the OLED.

Referring to FIG. 8, as the grayscale value of pixel data increases, the gate-source voltage $V_{GS}$ of the driving element increases ($V_{GS2}>V_{GS1}$). At this time, the operating point of the OLED, which can be used as the light-emitting element EL, is moved from $V_{S2}$ to $V_{S1}$ ($V_{S2}>V_{S1}$), and the higher the grayscale value of the pixel data, the larger the threshold voltage shift (Vth shift) of the driving element. As a result, the slope of the I-V conduction curve is reduced. Therefore, as the grayscale value of the pixel data increases, the S-factor S increases. The S factor S is the reciprocal of the slope value of the IV conduction curve.

Figure 9:
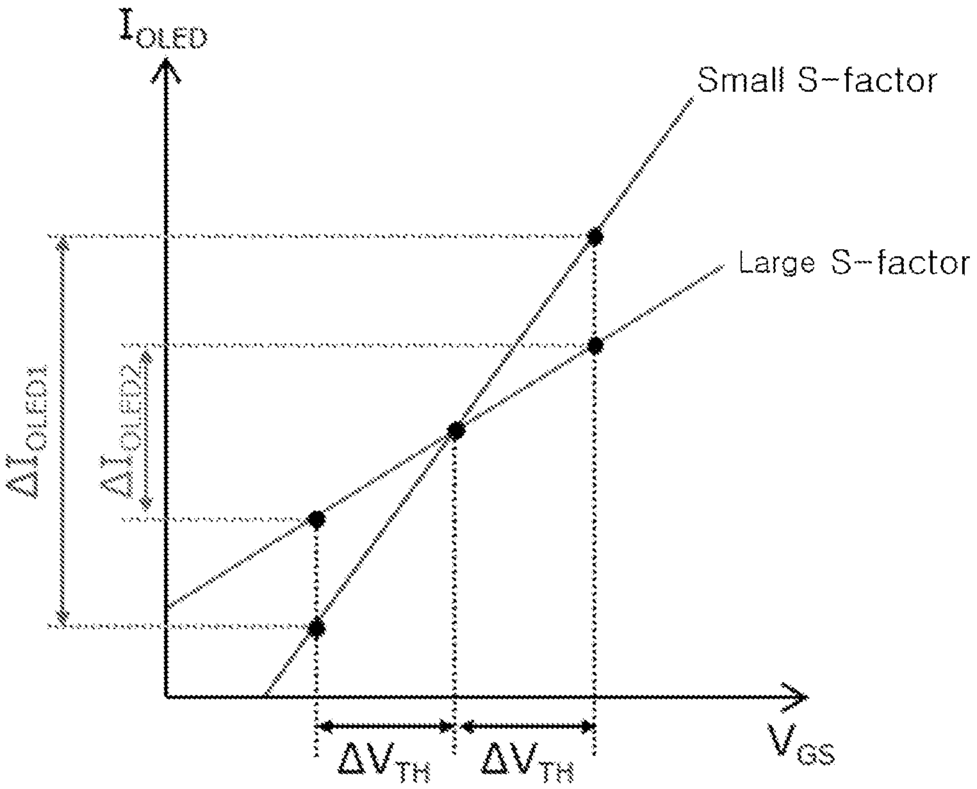
FIG. 9 is a view showing current variations of a light-emitting element according to an increase in the S-factor based on the same current.

FIG. 9 is a view showing current variations of the light-emitting element according to an increase in the S-factor based on the same current.

Referring to FIG. 9, as the S-factor S increases, the slope of the I-V conduction curve in the low grayscale region decreases. At this time, when the same current flows through the third node DTS in a pixel circuit having a larger S-factor and a pixel circuit having a relatively small S-factor of the driving element DT, the current variation $\Delta I_{OLED}$ of the OLED is smaller in the driving element DT having a larger S-factor when the threshold voltage variation ΔVth of the driving element occurs in the low grayscale region. As a result, since the current variation of the light-emitting element EL in the low grayscale region of the pixel data is small even when a cumulative driving time of the pixels increases and thus the threshold voltage shift of the driving element DT gets larger, there is hardly any deterioration in image quality in the low grayscale region even if the display device is used for a prolonged time.

The S-factor S may be adjusted by the capacitance ratio of the second and third capacitors C1 and C2. The capacitance of each of the second and third capacitors C1 and C2 is set to a value smaller than that of the first capacitor Cst. The capacitance of the second capacitor C1 is set to a value greater than the capacitance of the third capacitor C2.

Figure 10:
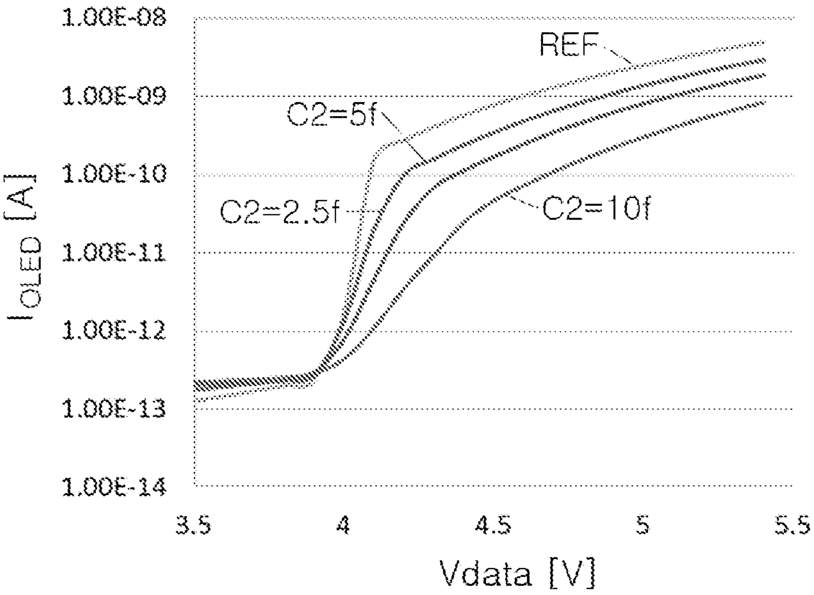
FIG. 10 is simulation results showing the change in the S-factor according to capacitor capacities of the pixel circuit shown in FIG. 3.

FIG. 10 is simulation results showing the change in the S-factor according to capacitor capacities of the pixel circuit shown in FIG. 3. In FIG. 10, the horizontal axis represents the data voltage Vdata [V] applied to the second node DTG, and the vertical axis represents the current $I_{OLED}$ [A] of the light-emitting element EL. In this simulation, the first capacitor Cst set to a capacitance of 150f and a second capacitor C1 set to a capacitance of 50f were used. The capacitance of the third capacitor C2 was changed to 2.5f, 5f, and 10f. As the capacitance value of the third capacitor C2 increases, the slope of the I-V conduction curve decreases, and thereby the S-factor S can be increased. Therefore, the S-factor for optimally driving the pixel circuit can be adjusted by the capacitance ratio of the second and third capacitors C1 and C2. In FIG. 10, 'REF' is a reference capacitance value.

Figure 11:
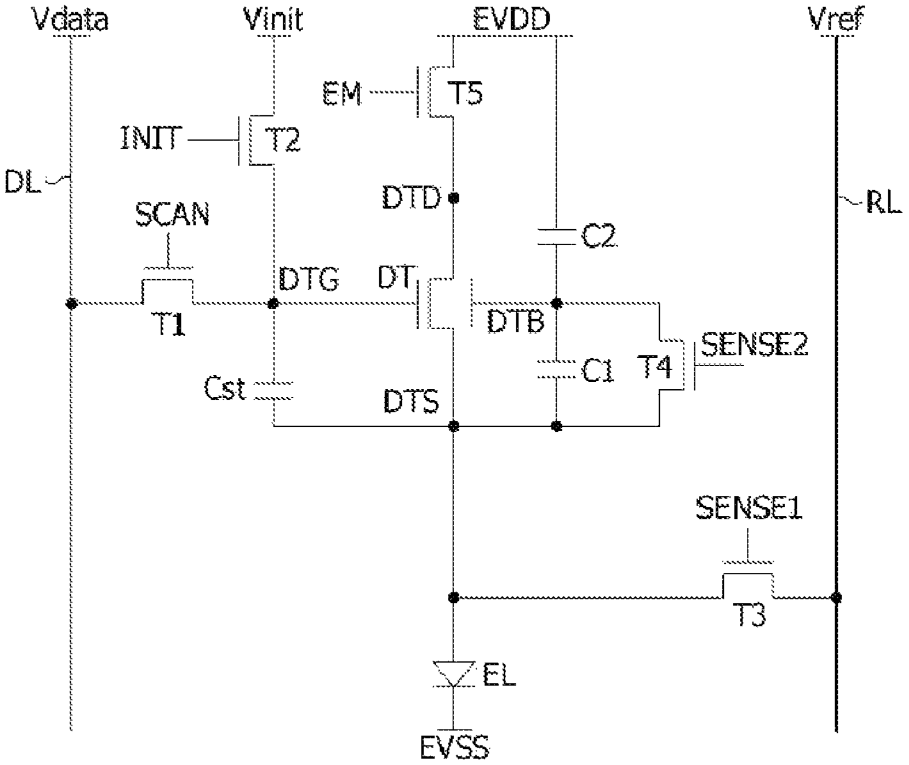
FIG. 11 is a circuit diagram showing a pixel circuit in accordance with another aspect of the present disclosure.
Figure 12:
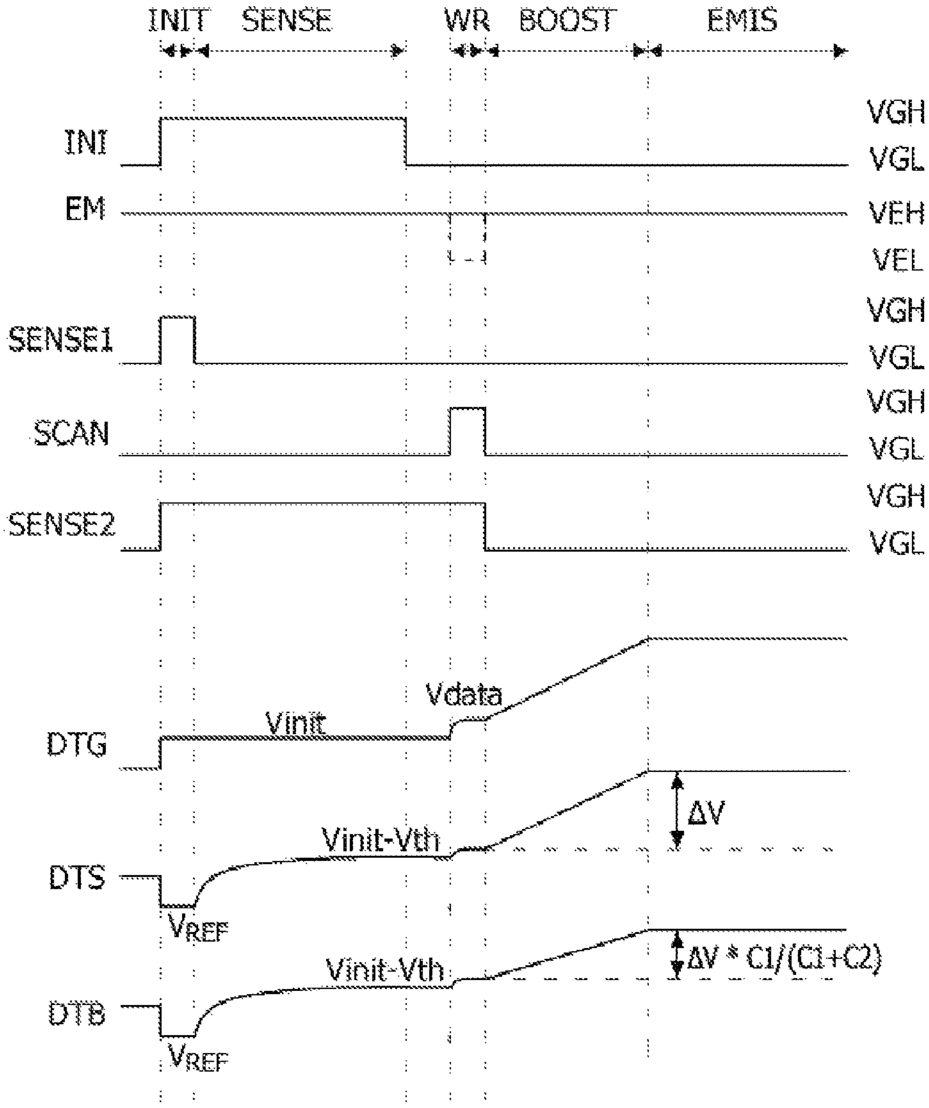
FIG. 12 is a waveform diagram showing gate signals applied to the pixel circuit shown in FIG. 11.

FIG. 11 is a circuit diagram showing a pixel circuit in accordance with another aspect of the present disclosure. FIG. 12 is a waveform diagram showing gate signals applied to the pixel circuit shown in FIG. 11. FIGS. 13A to 13D are circuit diagrams showing, in steps, the operation of the pixel circuit shown in FIG. 11.

Referring to FIG. 11 to FIG. 13D, the pixel circuit includes a light-emitting element EL, a driving element DT for driving the light-emitting element EL, a plurality of switch elements T1 to T5, and first to third capacitors Cst, C1, and C2. The driving element DT and the switch elements T1 to T5 may be implemented with n-channel oxide TFTs.

This pixel circuit is connected to a VDD line to which a pixel driving voltage EVDD is applied, a VSS line to which a low-potential power supply voltage EVSS is applied, an INIT line to which an initialization voltage Vinit is applied, an REF line RL to which a reference voltage Vref is applied, a data line DL to which a data voltage Vdata is applied, and gate lines to which gate signals INI, SENSE1, SENSE2, SCAN, and EM are applied. The pixel driving voltage EVDD is a voltage higher than the low-potential power supply voltage EVSS. The initialization voltage Vinit is set to a constant voltage at which the driving element DT can be turned on within a data voltage range. The reference voltage Vref is set to a low-potential constant voltage close to the low-potential power supply voltage EVSS. Gate-on voltages VGH and VEH of the gate signals INI, SENSE1, SENSE2, SCAN, and EM may be set to voltages higher than the pixel driving voltage EVDD. Gate-off voltages VGL and VEL of the gate signals INI, SENSE1, SENSE2, SCAN, and EM may be set to voltages lower than the low-potential power supply voltage EVSS.

In order to drive the pixel circuit shown in FIG. 11, a gate driver 120 may include a first shift register that sequentially outputs the scan pulses SCAN, a second shift register that sequentially outputs the first sensing pulses SENSE1, a third shift register that sequentially outputs the second sensing pulses SENSE2, a fourth shift register that sequentially outputs the initialization pulses INI, and a fifth shift register that sequentially outputs pulses of the EM signal EM.

The driving period of the pixel circuit may be divided into an initialization step INIT, a sensing step SENSE, a data writing step WR, a boosting step BOOST, and a light emission step EMIS, as shown in FIG. 12. In the initialization step INIT, the pixel circuit is initialized. In the initialization step INIT, the voltage at the second node DTG is initialized to the initialization voltage Vinit, and the voltages at the third and fourth nodes DTS and DTB are initialized to the reference voltage Vref.

In the sensing step SENSE, the threshold voltage Vth of the driving element DT that has been shifted by a back-bias voltage $V_{BS}$ is sensed and stored in the first capacitor Cst. In the data writing step WR, the data voltage Vdata of pixel data is applied to the second node DTG. In the sensing step SENSE, the voltage at the second node DTG maintains the initialization voltage Vinit, and the voltages at the third and fourth nodes DTS and DTB change to Vinit−Vth, and the threshold voltage Vth of the driving element DT is sensed. In the data writing step WR, the data voltage Vdata is applied to the second node DTG, and accordingly, the voltages at the third and fourth nodes DTS and DTB are changed.

After the voltages at the second to fourth nodes DTG, DTS, and DTB that are floated rise in the boosting step BOOST, the light-emitting element EL may emit light at a luminance corresponding to the grayscale value of the pixel data in the light emission step EMIS. In the boosting step BOOST, the voltage Vb at the fourth node DTB gets lower than the voltage Vs at the third node DTS due to the capacitor transfer rate C/(C1+C2). In the boosting step BOOST, let the amount of voltage change at the third node DTS be 'ΔV', then the voltage at the fourth node DTB is $$Vb = \Delta V \times \frac{C1}{C1 + C2}.$$

In the light emission step EMIS, the voltages at the second to fourth nodes DTG, DTS, and DTB may maintain the final voltage increased in the boosting step BOOST. In the light emission step EMIS, the driving element DT generates a current according to the gate-source voltage $V_{GS}$. At this time, the light-emitting element EL may emit light at a luminance corresponding to the grayscale value of the pixel data according to the current from the driving element DT.

The EM signal EM may maintain the gate-on voltage VEH in the initialization step INIT, the sensing step SENSE, the data writing step WR, the boosting step BOOST, and the light emission step EMIS. Since a fifth switch element T5 is turned on when the EM signal EM is at the gate-on voltage VEH, the voltage at the first node DTD is the pixel driving voltage EVDD. The EM signal EM may be inverted from the gate-on voltage VGH to the gate-off voltage VEL in the data writing step WR. Accordingly, the fifth switch element T5 may maintain the on state or be turned off in the data writing step WR.

In the initialization step INIT, the initialization pulse INI, the EM signal EM, the first sensing pulse SENSE1, and the second sensing pulse SENSE2 are generated at the gate-on voltages VGH and VEH. The scan pulse SCAN is at the gate-off voltage VGL in the initialization step INIT.

In the sensing step SENSE, the initialization pulse INIT, the EM signal EM, and the second sensing pulse SENSE2 are generated at the gate-on voltages VGH and VEH. The first sensing pulse SENSE1 and the scan pulse SCAN are at the gate-off voltages VGL in the sensing step SENSE.

In the data writing step WR, the scan pulse SCAN is generated at the gate-on voltage VGH synchronized with the data voltage Vdata of the pixel data. The EM signal EM and the second sensing pulse SENSE2 may maintain the gate-on voltage VEH in the data writing step WR. The initialization pulse INI and the first sensing pulse SENSE1 are at the gate-off voltages VGL and VEL in the data writing step WR.

In the boosting step BOOST, the gate signals INI, SENSE1, SENSE2, and SCAN except for the EM signal EM are at the gate-off voltages. In the light emission step EMIS, the EM signal EM maintains the gate-on voltage VEH, and the other gate signals INI, SENSE1, SENSE2, and SCAN maintain the gate-off voltage VGL.

In the pixel circuit shown in FIG. 11, the light-emitting element EL may be implemented with an OLED. The anode electrode of the light-emitting element EL is connected to the third node DTS. The cathode electrode of the light-emitting element EL is connected to the VSS line to which the low-potential power supply voltage EVSS is applied.

The driving element DT generates a current according to the gate-source voltage VGS and thereby drives the light-emitting element EL. The driving element DT includes a first electrode connected to the first node DTD, a first gate electrode connected to the second node DTG, a second electrode connected to the third node DTS, and a second gate electrode connected to the fourth node DTB.

The first capacitor Cst is connected between the second node DTG and the third node DTS. The second capacitor C1 is connected between the third node DTS and the fourth node DTB. The third capacitor C2 is connected between the fourth node DTB and the VDD line to which the pixel driving voltage EVDD is applied. The third capacitor C2 may be connected between the first node DTD and the fourth node DTB.

A first switch element T1 is turned on according to the gate-on voltage VGH of the scan pulse SCAN synchronized with the data voltage Vdata in the data writing step WR and connects the data line DL to the second node DTG. The data voltage Vdata is applied to the second node DTG in the data writing step WR. The first switch element T1 includes a first electrode connected to the data line DL to which the data voltage Vdata is applied, a gate electrode connected to a first gate line to which the scan pulse SCAN is applied, and a second electrode connected to the second node DTG.

A second switch element T2 is turned on according to the gate-on voltage VGH of the initialization pulse INI in the initialization step INIT and the sensing step SENSE and applies the initialization voltage Vinit to the second node DTG. The second switch element T2 includes a first electrode connected to the INIT line to which the initialization voltage Vinit is applied, a gate electrode connected to a second gate line to which the initialization pulse INI is applied, and a second electrode connected to the second node DTG.

A third switch element T3 is turned on according to the gate-on voltage VGH of the first sensing pulse SENSE1 in the initialization step INIT and connects the third node DTS to the REF line RL to which the reference voltage Vref is applied. The third switch element T3 includes a first electrode connected to the third node DTS, a gate electrode connected to a third gate line to which the first sensing pulse SENSE1 is applied, and a second electrode connected to the REF line RL.

A fourth switch element T4 is turned on according to the gate-on voltage VGH of the second sensing pulse SENSE2 in the initialization step INIT, the sensing step SENSE, and the data writing step WR, and connects the third node DTS to the fourth node DTB. The fourth switch element T4 includes a first electrode connected to the third node DTS, a gate electrode connected to a fourth gate line to which the second sensing pulse SENSE2 is applied, and a second electrode connected to the fourth node DTB.

The fifth switch element T5 includes a first electrode connected to the VDD line to which the pixel driving voltage EVDD is applied, a gate electrode connected to a fifth gate line to which the EM signal EM is applied, and a second electrode connected to the first node DTD.

Figure 13A:
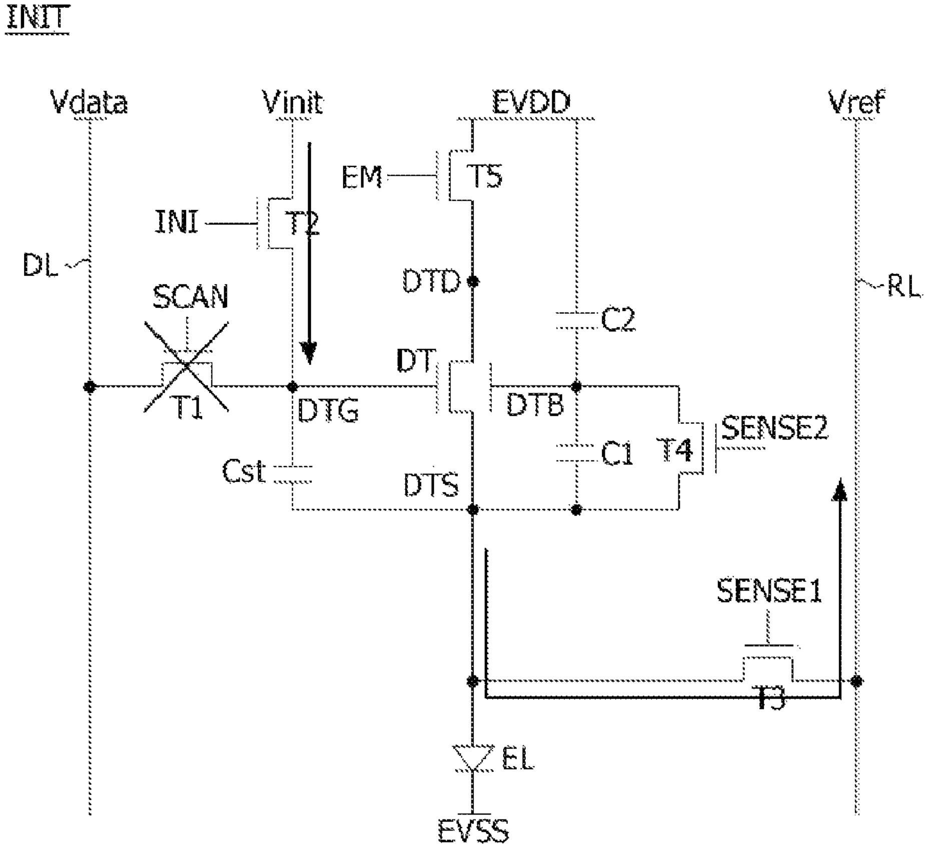
FIGS. 13A to 13D are circuit diagrams showing, in steps, the operation of the pixel circuit shown in FIG. 11.

In the initialization step INIT, as shown in FIG. 13A, the second to fifth switch elements T2 to T5 and the driving element DT are turned on, and the first switch element T1 is turned off. At this time, the light-emitting element EL is not turned on.

Figure 13B:
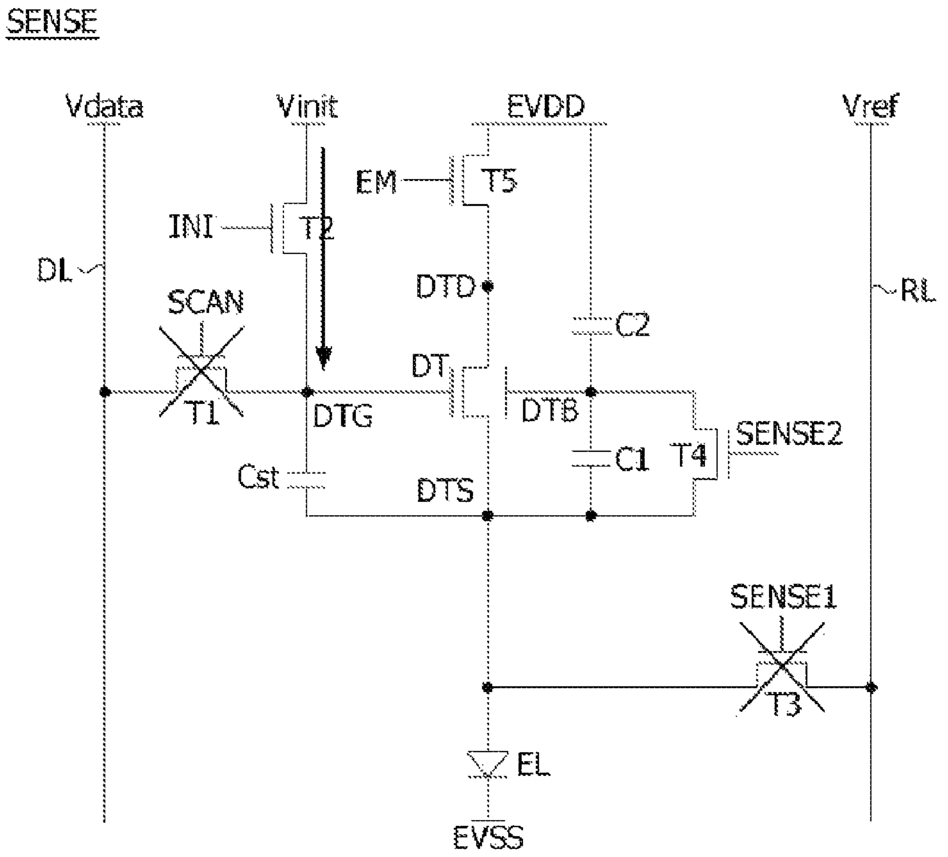

In the sensing step SENSE, as shown in FIG. 13B, the second, fourth, and fifth switch elements T2, T4, and T5 maintain the on state, and the third switch element T3 is turned off. In the sensing step SENSE, when the voltage at the third node DTS rises and the gate-source voltage $V_{GS}$ of the driving element DT reaches the threshold voltage Vth, the driving element DT is turned off. At this time, the voltages at the third and fourth nodes DTS and DTB change to Vinit−Vth, and this voltage is stored in the first capacitor Cst.

Figure 13C:
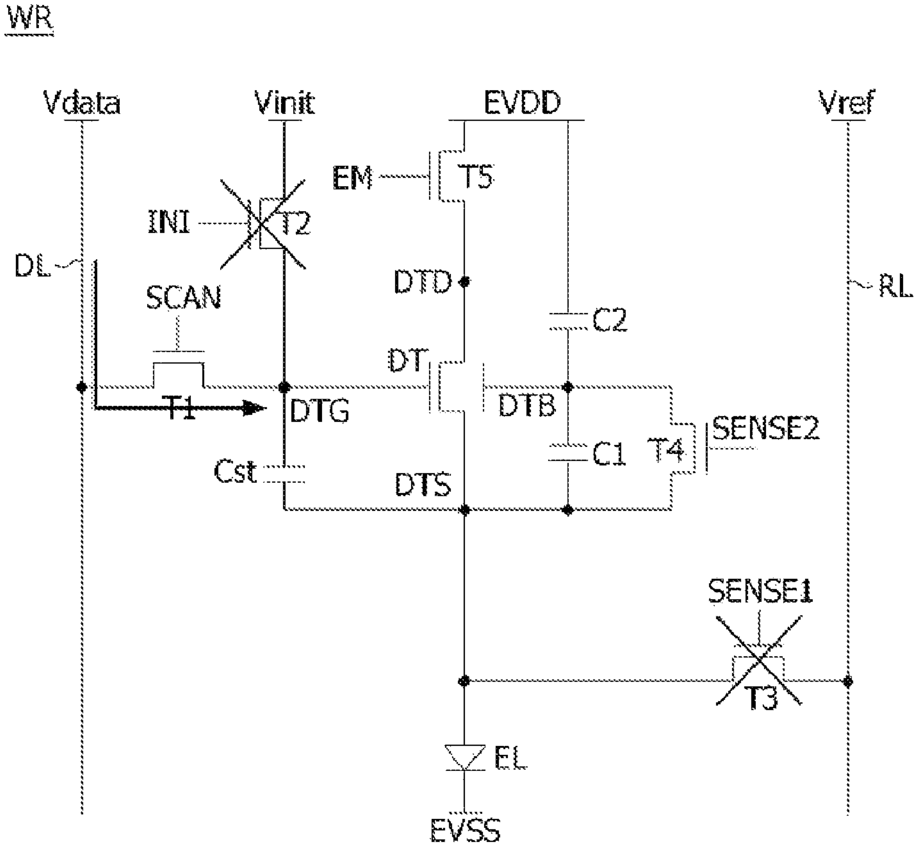

In the data writing step WR, as shown in FIG. 13C, the first switch element T1 is turned on and the second switch element T2 is turned off. At this time, the data voltage Vdata of the pixel data is applied to the second node DTG and thus the voltage of the second node DTG is changed to the data voltage Vdata. In the data writing step WR, the fourth and fifth switch elements T4 and T5 maintain the on state, and the third switch element T3 maintains the off state.

During the boosting step BOOST, the gate signals INI, SCAN, SENSE1, and SENSE2 except for the EM signal EM are at the gate-off voltage VGL. During the boosting step BOOST, the voltages at the second to fourth nodes DTG, DTS, and DTB that are floated rise. At this time, the voltage Vb at the fourth node DTB gets lower than the voltage Vs of the third node DTS as a voltage loss occurs due to the capacitor transfer rate.

Figure 13D:
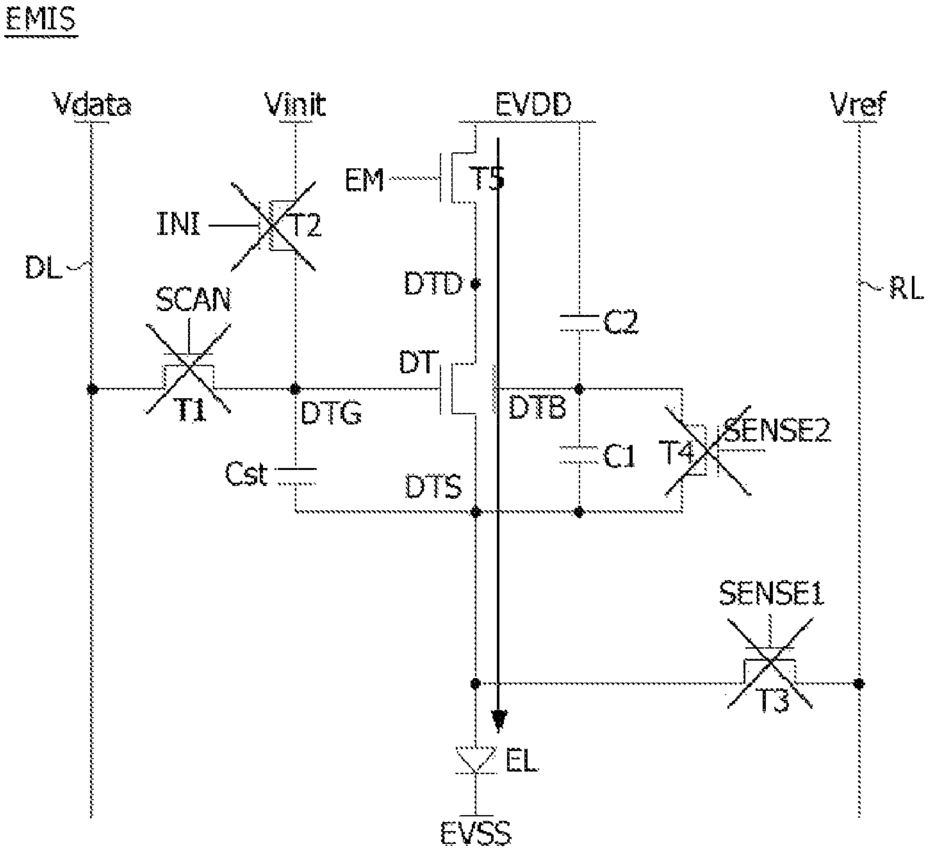

In the light emission step EMIS, as shown in FIG. 13D, the fifth switch element T5 maintains the on state, and the first to fourth switch elements T1 to T4 maintain the off state. At this time, a current generated according to the gate-source voltage Vgs of the driving element DT, i.e., the voltage between the second and third nodes, may be supplied to the light-emitting element EL to cause the light-emitting element EL to emit light. In the light emission step EMIS in which the light-emitting element EL is driven in this way, the voltage Vb at the fourth node DTB is lower than the voltage Vs of the third node DTS.

Figure 14:
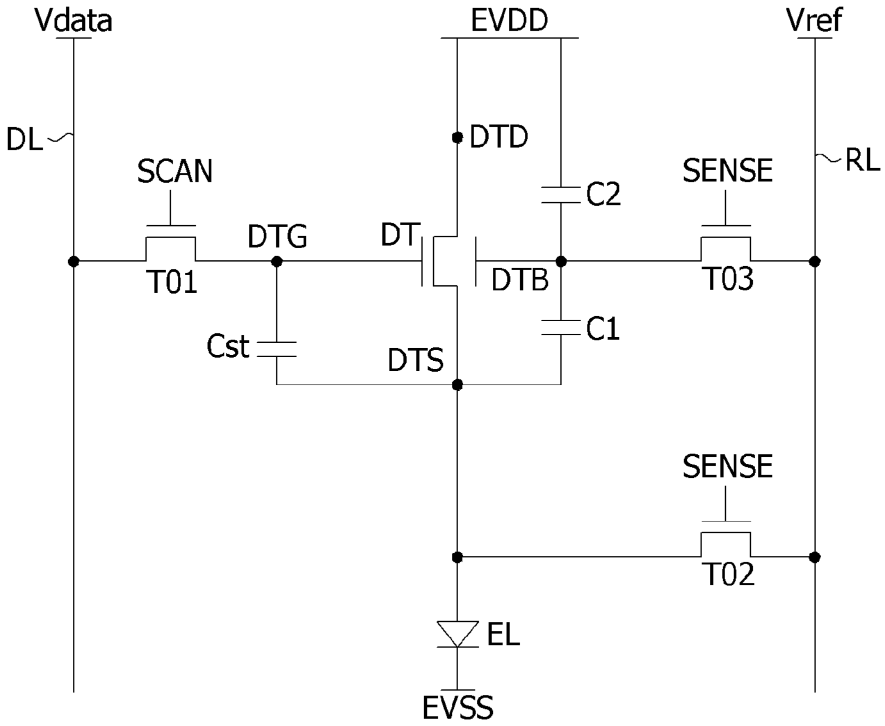
FIG. 14 is a circuit diagram showing a pixel circuit in accordance with another aspect of the present disclosure.
Figure 15:
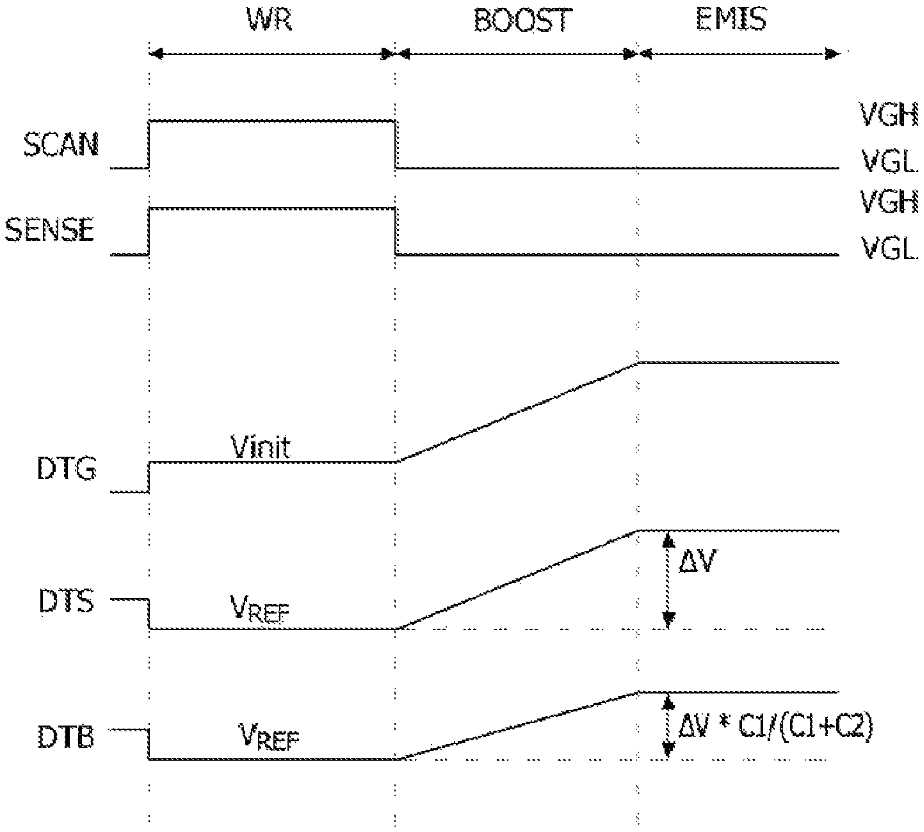
FIG. 15 is a waveform diagram showing gate signals applied to the pixel circuit shown in FIG. 14.

FIG. 14 is a circuit diagram showing a pixel circuit in accordance with another aspect of the present disclosure. FIG. 15 is a waveform diagram showing gate signals applied to the pixel circuit shown in FIG. 14.

Referring to FIGS. 14 and 15, the pixel circuit includes a light-emitting element EL, a driving element DT for driving the light-emitting element EL, a plurality of switch elements T01 to T03, and first to third capacitors Cst, C1, and C2. The driving element DT and the switch elements T01 to T03 may be implemented with n-channel oxide TFTs.

This pixel circuit is connected to a VDD line to which a pixel driving voltage EVDD is applied, a VSS line to which a low-potential power supply voltage EVSS is applied, an REF line RL to which a reference voltage Vref is applied, a data line DL to which a data voltage Vdata is applied, and gate lines to which gate signals SENSE and SCAN are applied. The pixel driving voltage EVDD is a voltage higher than the low-potential power supply voltage EVSS. The reference voltage Vref is set to a low-potential constant voltage close to the low-potential power supply voltage EVSS. A gate-on voltage VGH of the gate signals SENSE and SCAN may be set to a voltage higher than the pixel driving voltage EVDD. A gate-off voltage VGL of the gate signals SENSE and SCAN may be set to a voltage lower than the low-potential power supply voltage EVSS.

In order to drive the pixel circuit shown in FIG. 14, a gate driver 120 may include a shift register that sequentially outputs the scan pulse SCAN and the sensing pulse SENSE. In another aspect, the gate driver 120 may include a first shift register that sequentially outputs the scan pulses SCAN and a second shift register that sequentially outputs the sensing pulses SENSE.

The driving period of the pixel circuit may be divided into a data writing step WR, a boosting step BOOST, and a light emission step EMIS, as shown in FIG. 15.

In the data writing step WR, the data voltage Vdata of pixel data is applied to a second node DTG. In the data writing step WR, the data voltage Vdata is applied to the second node DTG, and the reference voltage Vref is applied to third and fourth nodes DTS and DTB.

After the voltages at the second to fourth nodes DTG, DTS, and DTB that are floated rise in the boosting step BOOST, the light-emitting element EL may emit light at a luminance corresponding to the grayscale value of the pixel data in the light emission step EMIS. In the boosting step BOOST, the voltage Vb at the fourth node DTB gets lower than the voltage Vs at the third node DTS due to the capacitor transfer rate C/(C1+C2). In the boosting step BOOST, let the amount of voltage change at the third node DTS be 'ΔV', then the voltage at the fourth node DTB is $$Vb = \Delta V \times \frac{C1}{C1 + C2}.$$

In the light emission step EMIS, the voltages at the second to fourth nodes DTG, DTS, and DTB may maintain the final voltage increased in the boosting step BOOST. In the light emission step EMIS, the driving element DT generates a current according to the gate-source voltage $V_{GS}$. At this time, the light-emitting element EL may emit light at a luminance corresponding to the grayscale value of the pixel data according to the current from the driving element DT.

In the data writing step WR, the scan pulse SCAN and the sensing pulse SENSE are simultaneously generated at the gate-on voltage VGH synchronized with the data voltage Vdata of the pixel data.

The scan pulse SCAN and the sensing pulse SENSE are inverted to the gate-off voltage VGH in the boosting step BOOST, and maintain the gate-off voltage VGL in the light emission step EMIS.

The light-emitting element EL may be implemented with an OLED. The anode electrode of the light-emitting element EL is connected to the third node DTS. The cathode electrode of the light-emitting element EL is connected to the VSS line to which the low-potential power supply voltage EVSS is applied.

The driving element DT generates a current according to the gate-source voltage $V_G$S and thereby drives the light-emitting element EL. The driving element DT includes a first electrode connected to the first node DTD, a first gate electrode connected to the second node DTG, a second electrode connected to the third node DTS, and a second gate electrode connected to the fourth node DTB.

The first capacitor Cst is connected between the second node DTG and the third node DTS. The second capacitor C1 is connected between the third node DTS and the fourth node DTB. The third capacitor C2 is connected between the fourth node DTB and the VDD line to which the pixel driving voltage EVDD is applied. The third capacitor C2 may be connected between the first node DTD and the fourth node DTB.

A first switch element T01 is turned on according to the gate-on voltage VGH of the scan pulse SCAN synchronized with the data voltage Vdata in the data writing step WR and connects the data line DL to the second node DTG. The data voltage Vdata is applied to the second node DTG in the data writing step WR. The first switch element T01 includes a first electrode connected to the data line DL to which the data voltage Vdata is applied, a gate electrode connected to a first gate line to which the scan pulse SCAN is applied, and a second electrode connected to the second node DTG.

A second switch element T02 is turned on according to the gate-on voltage VGH of the sensing pulse SENSE in the data writing step WR, and connects the third node DTS to the REF line RL to which the reference voltage Vref is applied. The second switch element T02 includes a first electrode connected to the third node DTS, a gate electrode connected to a second gate line to which the sensing pulse SENSE is applied, and a second electrode connected to the REF line RL.

A third switch element T03 is turned on according to the gate-on voltage VGH of the sensing pulse SENSE in the data writing step WR and connects the fourth node DTB to the REF line RL. The third switch element T03 includes a first electrode connected to the third node DTS, a gate electrode connected to a second gate line to which the sensing pulse SENSE is applied, and a second electrode connected to the REF line RL.

The pixel circuit shown in FIG. 14 may be connected to an external compensation circuit. The external compensation circuit includes an ADC (analog to digital converter) that converts the sensed voltage stored in the REF line RL connected to the pixel circuit into digital data. The sensed voltage may include the electrical characteristics of the driving element DT, for example, the threshold voltage and/or mobility. An integrator may be connected to the input terminal of the ADC. A timing controller 130 to which the external compensation circuit is applied may generate a compensation value for compensating for a change in the electrical characteristics of the driving element DT according to the sensed data inputted from the ADC, and add or multiply this compensation value to or by the pixel data of an input image, thereby compensating for the change in the electrical characteristics of the driving element DT. The ADC may be embedded in a data driver 110.

The present disclosure, described above do not specify essential features of the claims, and thus, the scope of the claims is not limited to the disclosure of the present disclosure.

Although the aspects of the present disclosure have been described in more detail with reference to the accompanying drawings, the present disclosure is not limited thereto and may be embodied in many different forms without departing from the technical concept of the present disclosure. Therefore, the aspects disclosed in the present disclosure are provided for illustrative purposes only and are not intended to limit the technical concept of the present disclosure. The scope of the technical concept of the present disclosure is not limited thereto. Therefore, it should be understood that the above-described aspects are illustrative in all aspects and do not limit the present disclosure. The protective scope of the present disclosure should be construed based on the following claims, and all the technical concepts in the equivalent scope thereof should be construed as falling within the scope of the present disclosure.

What is claimed is:

1. A display device comprising:

a display panel on which a plurality of data lines, a plurality of gate lines intersecting the plurality of data lines, a plurality of power lines, and a plurality of pixel circuits connected to the data lines, the gate lines, and the power lines are disposed;

a data driver configured to supply a data voltage of pixel data to the data lines; and a gate driver configured to supply a gate signal to the gate lines, wherein each of the pixel circuits comprises:

a driving transistor comprising a first electrode connected to a first node to which a pixel driving voltage is applied, a first gate electrode connected to a second node, a second electrode connected to a third node, and a second gate electrode connected to a fourth node, and configured to supply an electric current to a light-emitting diode;

a first switch transistor configured to be turned on according to a gate-on voltage of the gate signal and supply the data voltage to the second node connected to the first gate electrode;

a first capacitor connected between the second node and the third node;

a second capacitor including a first electrode directly connected to the third node and a second electrode directly connected to the fourth node to which a reference voltage is applied; and a third capacitor connected between the fourth node and the first node or between the fourth node and a first power line to which the pixel driving voltage is applied.

2. The display device of claim 1, wherein a capacity of the second capacitor and a capacity of the third capacitor are smaller than that of the first capacitor, and the capacity of the second capacitor is greater than that of the third capacitor.

3. The display device of claim 1, wherein a voltage at the fourth node is lower than a voltage at the third node when the light-emitting diode is driven.

4. The display device of claim 1, wherein the gate signal comprises:

an initialization pulse, a first sensing pulse, a second sensing pulse, a scan pulse, and an emission control signal, and wherein the pixel circuit further comprises:

a second switch transistor configured to be turned on according to a gate-on voltage of the initialization pulse and apply an initialization voltage to the second node;

a third switch transistor configured to be turned on according to a gate-on voltage of the first sensing pulse and connected the third node and a second power line to which a reference voltage is applied;

a fourth switch transistor configured to be turned on according to a gate-on voltage of the second sensing pulse and connected the third node and the fourth node; and a fifth switch transistor configured to be turned on according to a gate-on voltage of the emission control signal and apply the pixel driving voltage to the first node, and wherein the first switch transistor is turned on according to a gate-on voltage of the scan pulse and supplies the data voltage to the second node.

5. The display device of claim 4, wherein the pixel circuit has a driving period that is divided into an initialization step, a sensing step, a data writing step, a boosting step, and a light emission step, in the initialization step, the initialization pulse, the emission control signal, the first sensing pulse, and the second sensing pulse are generated at the gate-on voltage, and a voltage of the scan pulse is a gate-off voltage, in the sensing step, the initialization pulse, the emission control signal, and the second sensing pulse are generated at the gate-on voltage, and voltages of the first sensing pulse and the scan pulse are the gate-off voltage, in the data writing step, the scan pulse is generated at the gate-on voltage synchronized with the data voltage, the emission control signal and the second sensing pulse are generated at the gate-on voltage, and the initialization pulse and the first sensing pulse are at the gate-off voltage, in the boosting step, the emission control signal is generated at the gate-on voltage, and voltages of the initialization pulse, the first sensing pulse, the second sensing pulse, and the scan pulse are the gate-off voltage, and in the light emission step, the emission control signal is generated at the gate-on voltage, and the voltages of the initialization pulse, the first sensing pulse, the second sensing pulse, and the scan pulse are the gate-off voltage.

6. The display device of claim 1, wherein the gate signal comprises a scan pulse and a sensing pulse.

7. The display device of claim 6, wherein the pixel circuit further comprises:

a second switch transistor configured to be turned on according to a gate-on voltage of the sensing pulse and connected the third node and a second power line to which the reference voltage is applied; and a third switch transistor configured to be turned on according to the gate-on voltage of the sensing pulse and connected the fourth node and the second power line, and wherein the first switch transistor is turned on according to a gate-on voltage of the scan pulse and supplies the data voltage to the second node.

8. The display device of claim 6, wherein the pixel circuit has a driving period that is divided into a data writing step, a boosting step, and a light emission step, in the data writing step, the scan pulse and the sensing pulse are generated at the gate-on voltage synchronized with the data voltage, and in the boosting step and the light emission step, voltages of the scan pulse and the sensing pulse are a gate-off voltage.

* * * * *